R. VON FOREGGER.
APPARATUS FOR REGENERATING AIR.
APPLICATION FILED AUG. 2, 1907.

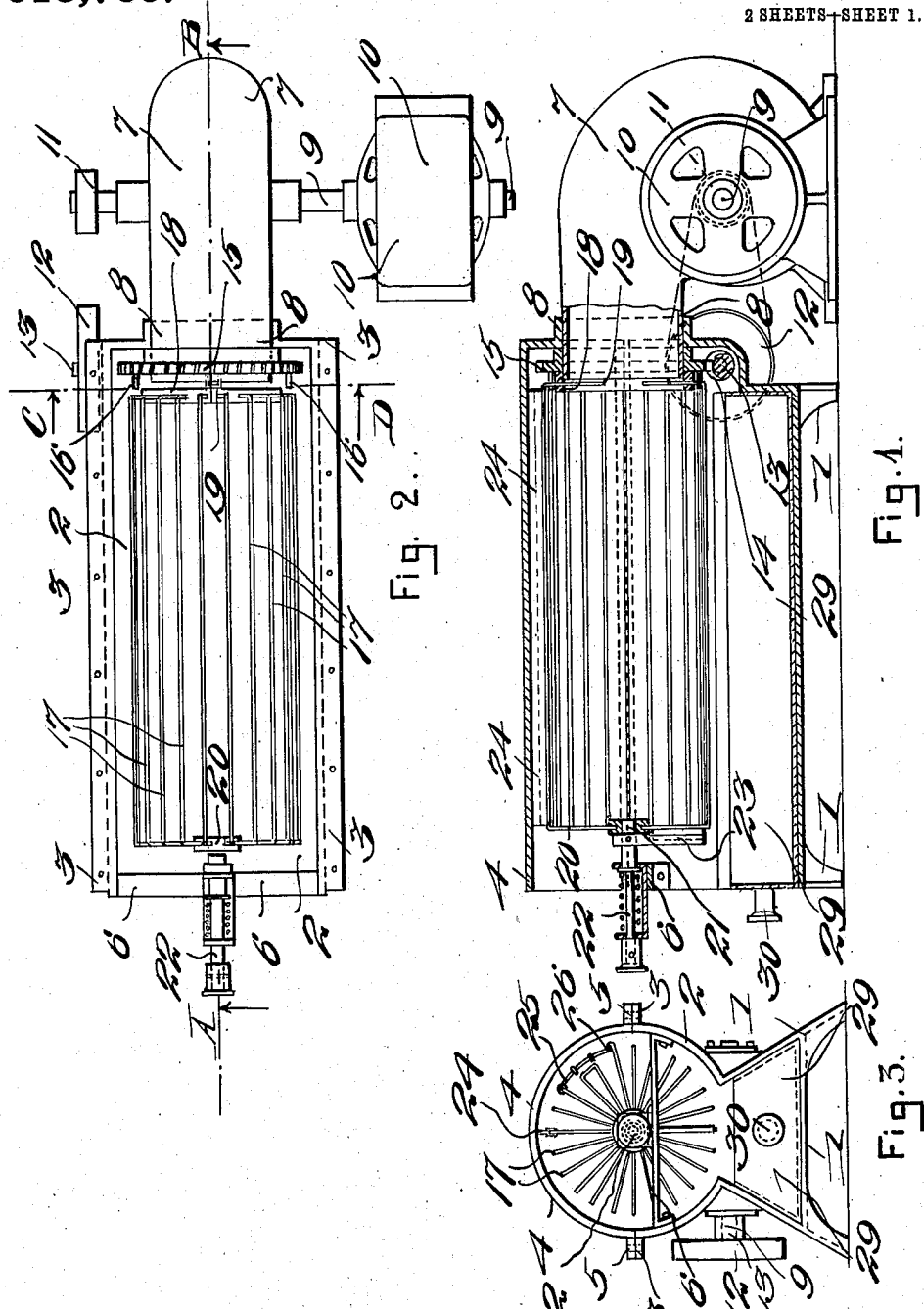

915,760.

Patented Mar. 23, 1909.
2 SHEETS—SHEET 2.

UNITED STATES PATENT OFFICE.

RICHARD VON FOREGGER, OF NEW YORK, N. Y., ASSIGNOR TO THE ROESSLER & HASSLACHER CHEMICAL CO., OF NEW YORK, N. Y., A CORPORATION OF NEW YORK.

APPARATUS FOR REGENERATING AIR.

No. 915,760.          Specification of Letters Patent.        Patented March 23, 1909.

Application filed August 2, 1907. Serial No. 386,758.

*To all whom it may concern:*

Be it known that I, RICHARD VON FOREGGER, a subject of the Emperor of Austria-Hungary, residing at New York city, in the county of Richmond and State of New York, have invented a certain new and useful Improvement in Apparatus for Regenerating Air, of which the following is a specification.

This invention relates to an apparatus for the regeneration of vitiated air wherein the air is caused to pass over a suitable compound adapted to generate oxygen and absorb carbon dioxid by reaction with said air.

In the following is described, in connection with the accompanying drawings, one embodiment of the invention the features thereof being more particularly set forth hereinafter in the claims.

Figure 4:
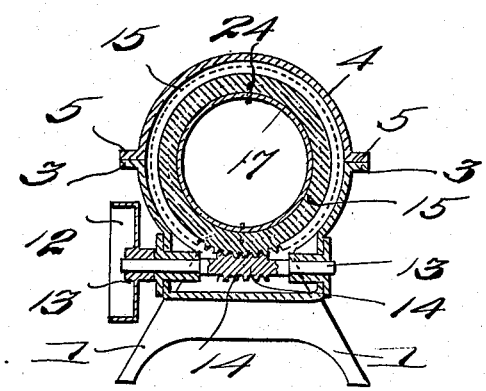
Figures 5, 6, 7:
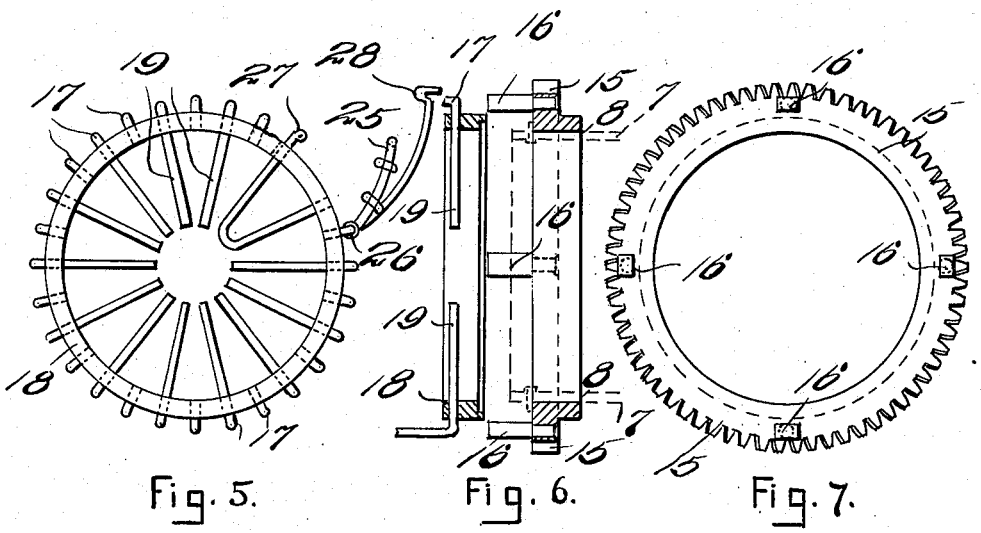

Figure 1 is a side elevation of the apparatus partly in longitudinal section along the line A—B of Fig. 2 and showing the parts in engaged position so that the cage is adapted to turn; Fig. 2 is a plan view of the same the upper half of the housing being removed and certain parts disengaged to permit the removal of the cage; Fig. 3 is a front elevation of the apparatus parts being omitted; Fig. 4 is a cross sectional view along the line C—D of Fig. 1; Fig. 5 is a rear end view of the cage on a slightly enlarged scale; Fig. 6 is a detail view on an enlarged scale partly in section of the locking and turning means for the cage; and Fig. 7 is a front view of the gear for driving the cage.

Similar numerals indicate similar parts throughout the several views.

1 represents a base or standard supporting the lower part 2 of a housing provided with flanges 3—3. The upper part 4 of the housing is provided with flanges 5—5 adapted to coöperate with flanges 3—3 and to be bolted thereto. One end of the cylindrical receptacle made by the housing is left open and across it is arranged a strap or brace 6 bolted to the lower part 2 of the housing as shown in Fig. 3. The other end of the housing is adapted to fit over the exhaust of a blower 7 as at 8. The blower 7 is driven by a suitable motor 10 through shaft 9, said shaft 9 carrying on its extreme outer end a pulley 11 adapted to drive a pulley 12 on shaft 13 journaled in the sides of the lower part 2 of the housing. Shaft 13 carries a worm gear 14 adapted to engage a gear-wheel 15 turning on the inner end of the exhaust of blower 7. Gear 15 carries pins 16—16 projecting outwardly.

17 represents a cage formed of wire and adapted to contain the compound to be used to regenerate the air. One end of the cage 17 is provided with a ring 18 having perforations in its periphery through which the ends 19 of the wires forming the cage are bent and project so as to form an end for the cage and hold said wires in position. The other end of the cage is formed by bending the ends of the wires at right angles and securing them in a ring 20 provided with a central opening 21. A spring controlled rod 22 is slidably supported on strap 6 and takes into the opening 21 in cage 17, the spring being so arranged that it will normally hold the rod in said opening. Said rod may also carry a scraping knife 23 of any suitable description for scraping the paste off the end of the cage.

24 is a scraper fastened to the cage itself which contacts with and scrapes the interior of the housing as the cage turns. The cage is journaled to turn on the end of rod 22 and the end of the exhaust of blower 7 as shown.

25 indicates a door hinged at 26 and adapted to take under a projecting wire 27 on the cage for the purpose of affording access to the interior thereof.

28 is a catch for holding door 25 in position.

29 is a drawer in the base or standard 1 to receive the particles falling from the cage.

30 is a handle for withdrawing the drawer from the standard.

The operation of the apparatus is as follows. The cage having been filled with a suitable substance, for example fused sodium peroxid, the apparatus is started by means of motor 10 which drives the blower 7 forcing air through the cage 17 out through the open end of the housing, the blower exhaust forming a clear, uninterrupted passage from the blower to the cage. Motor 10 through shaft 9, pulleys 11 and 12, shaft 13 and worm 14 drives the gear 15 which in turn, because of pins 16 resting between the wires of the cage 17, turns said cage 17 so that the sodium peroxid is agitated or tumbled about. The passage of the air from the blower over the sodium peroxid will free oxygen and cause carbon dioxid to be absorbed forming a carbonate crust which will be caused to drop off the sodium peroxid by reason of the tumbling and will fall into the drawer 29 where it will continue to absorb carbon dioxid for a time and may then be removed. The regulation of the generation of oxygen is attained by changing the speed of rotation of the cage or by regulating the removal of the crust of carbonate or bicarbonate from the peroxid.

It is obvious that the humidity of the air may be increased by any desirable means while the air is passing either through the blower or the cage.

I do not restrict myself to the details shown and described as they may be varied without departing from the spirit of my invention.

What I claim is:

1. In an apparatus for the chemical purification of air, a receptacle, means for supporting the same, a blower in communication with said receptacle, a gear wheel rotatable on the exhaust of said blower, means for driving said gear wheel and means for coupling said gear wheel and said receptacle.

2. In an apparatus for the chemical purification of air, a receptacle, means for rotatably supporting the same, a blower in communication with said receptacle, a gear wheel rotatably supported on the outside of the exhaust of said blower, means for driving said gear wheel and means for engaging and disengaging said gear wheel and said receptacle.

3. In an apparatus for the chemical purification of air, a receptacle, a housing therefor, means for supporting said receptacle within said housing, means for rotating said receptacle, a scraper mounted on said receptacle adapted to scrape the interior of said housing and a blower in communication with said receptacle.

4. In an apparatus for the chemical purification of air, a receptacle, means for supporting the same, means mounted on said supporting means for scraping said receptacle, a blower in communication with said receptacle, a gear wheel rotatable on the exhaust of said blower, means for driving said gear wheel and means for detachably coupling said gear wheel and said receptacle.

5. In an apparatus for the chemical purification of air, a receptacle, a housing therefor, means for supporting said receptacle within said housing, a scraper on said supporting means adapted to act on said receptacle, means for rotating said receptacle, a scraper mounted on said receptacle adapted to scrape the interior of said housing and a blower in communication with said receptacle.

In testimony whereof I have hereunto signed my name in the presence of two subscribing witnesses.

RICHARD VON FOREGGER.

Witnesses:
SEABURY C. MASTICK,
K. G. LEARD.